United States Patent
Inoue

(10) Patent No.: US 9,549,083 B2
(45) Date of Patent: Jan. 17, 2017

(54) IMAGE COMMUNICATION APPARATUS CAPABLE OF PERFORMING FACSIMILE COMMUNICATION VIA IP NETWORK, METHOD OF CONTROLLING THE SAME, AND STORAGE MEDIUM

(71) Applicant: CANON KABUSHIKI KAISHA, Tokyo (JP)

(72) Inventor: Yutaka Inoue, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 410 days.

(21) Appl. No.: 14/127,783

(22) PCT Filed: Oct. 25, 2013

(86) PCT No.: PCT/JP2013/079649
§ 371 (c)(1),
(2) Date: Dec. 19, 2013

(87) PCT Pub. No.: WO2014/077138
PCT Pub. Date: May 22, 2014

(65) Prior Publication Data
US 2016/0165069 A1 Jun. 9, 2016

(30) Foreign Application Priority Data
Nov. 13, 2012 (JP) .................. 2012-249425

(51) Int. Cl.
*G06F 15/00* (2006.01)
*H04N 1/00* (2006.01)
(Continued)

(52) U.S. Cl.
CPC .......... *H04N 1/001* (2013.01); *H04M 7/0069* (2013.01); *H04N 1/0022* (2013.01);
(Continued)

(58) Field of Classification Search
CPC .................................................... H04N 7/0069
(Continued)

(56) References Cited

U.S. PATENT DOCUMENTS

2005/0117183 A1 6/2005 Adlakha et al.
2006/0136596 A1* 6/2006 Izumi .................. H04L 12/5692
709/230

FOREIGN PATENT DOCUMENTS

EP 1 536 611 A2 6/2005
JP 04-243371 A 8/1992
(Continued)

OTHER PUBLICATIONS

International Search Report for corresponding PCT/JP2013/079649, mail date Feb. 4, 2014.

*Primary Examiner* — Saeid Ebrahimi Dehkord
(74) *Attorney, Agent, or Firm* — Rossi, Kimms & McDowell LLP

(57) ABSTRACT

The present invention provides a technique that enables an image communication apparatus capable of performing voice communication and T.30 in-band FAX communication over the IP network to positively detect a CNG signal and achieve switching to FAX reception in the answerphone connection mode and the FAX/TEL-switching mode. The communication apparatus includes a MODEM that controls facsimile communication and a SLIC that controls a telephone. A selector includes switches for connecting the IP network and the MODEM, and switches for connecting the IP network and the SLIC. A CPU controls the switches of the selector such that signals from the IP network are supplied to both of the MODEM and the SLIC.

17 Claims, 14 Drawing Sheets

(51) Int. Cl.
  *H04N 1/327* (2006.01)
  *H04M 7/00* (2006.01)
(52) U.S. Cl.
  CPC ..... *H04N 1/00312* (2013.01); *H04N 1/32708* (2013.01); *H04N 1/32719* (2013.01); *H04N 1/32756* (2013.01)
(58) Field of Classification Search
  USPC ........................................................ 358/1.15
  See application file for complete search history.

(56) References Cited

FOREIGN PATENT DOCUMENTS

| JP | 05-095439 A | 4/1993 |
|----|-------------|--------|
| JP | 05-145695 A | 6/1993 |
| JP | 2004-187262 A | 7/2004 |
| JP | 2005-168013 A | 6/2005 |
| KR | 1020050073517 A | 7/2005 |

\* cited by examiner

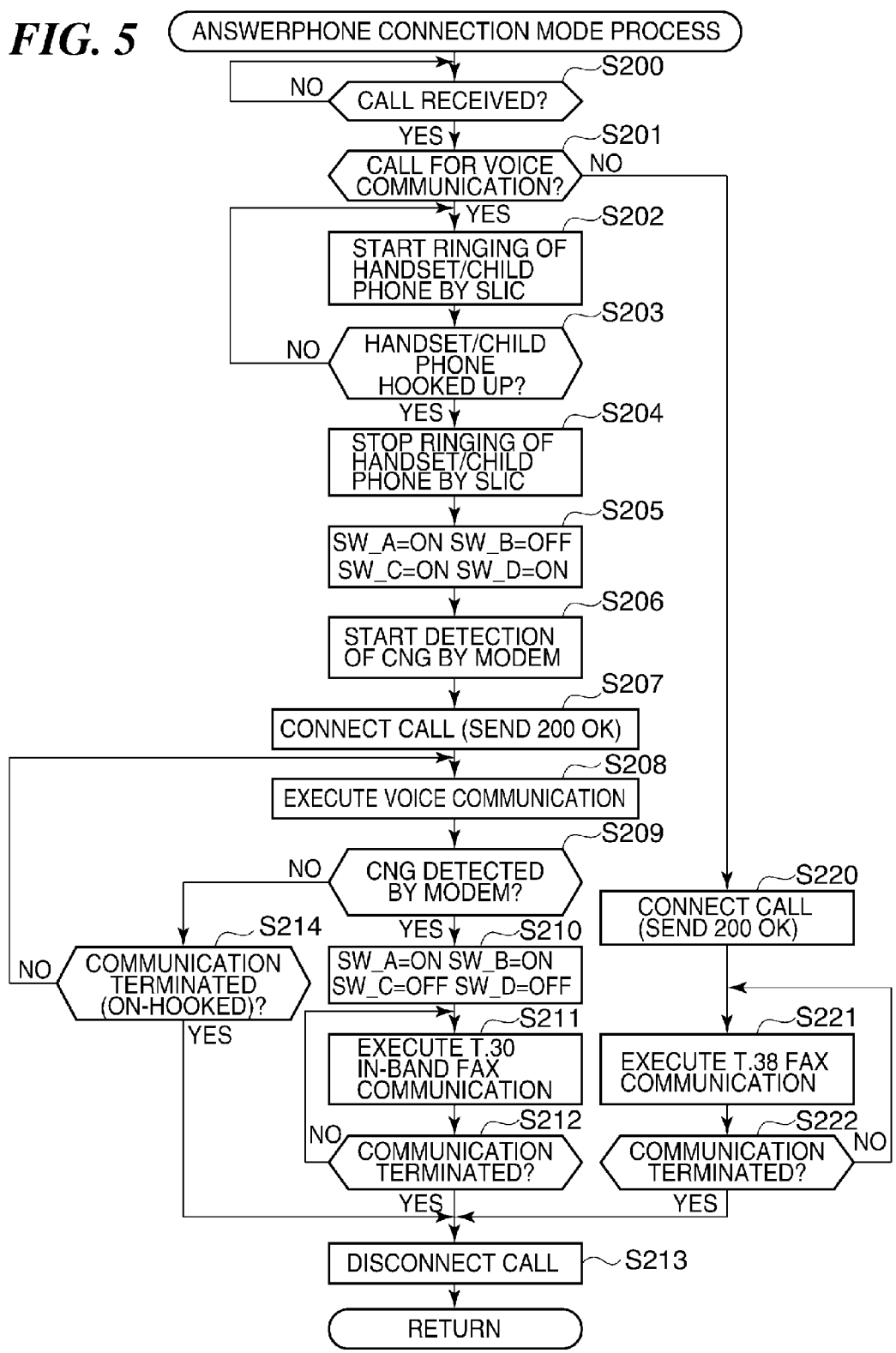

*FIG. 9*

|  | SW_A | SW_B | SW_C | SW_D |
|---|---|---|---|---|
| T.30 IN-BAND FAX COMMUNICATION | ON | ON | OFF | OFF |
| VOICE COMMUNICATION IN ANSWERPHONE CONNECTION MODE | ON | OFF | ON | ON |
| VOICE COMMUNICATION IN MODE OTHER THAN ANSWERPHONE CONNECTION MODE | OFF | OFF | ON | ON |
| DURING SWITCHING OPERATION IN FAX/TEL-SWITCHING MODE | ON | ON | OFF | OFF |

FIG. 11

INVITE SIGNAL IN T.38 FAX COMMUNICATION

INVITE sip:bob@example.com SIP/2.0

Via: SIP/2 0/UDP pc33.○×○.co.jp branch=z9hG4bKnashds8

Max-Forwards: 70

To: Bob ⟨sip:bob@example.com⟩

From: Alice ⟨sip:alice@ ○×○.co.jp⟩;tag=1928301774

Call-ID: a81b4c76e66710@pc33.○×○.co.jp

CSeq: 314159 1NVITE

Contact:<sip:alice@pc33.○×○.co.jp⟩

Conten-Typei application/sdp

Content-Length: 153 v=0 o=alice 53655765 2353687637 1N IP4 pc33.○×○.co.jp s=- t=0 0 m=application 30000 TCP t38

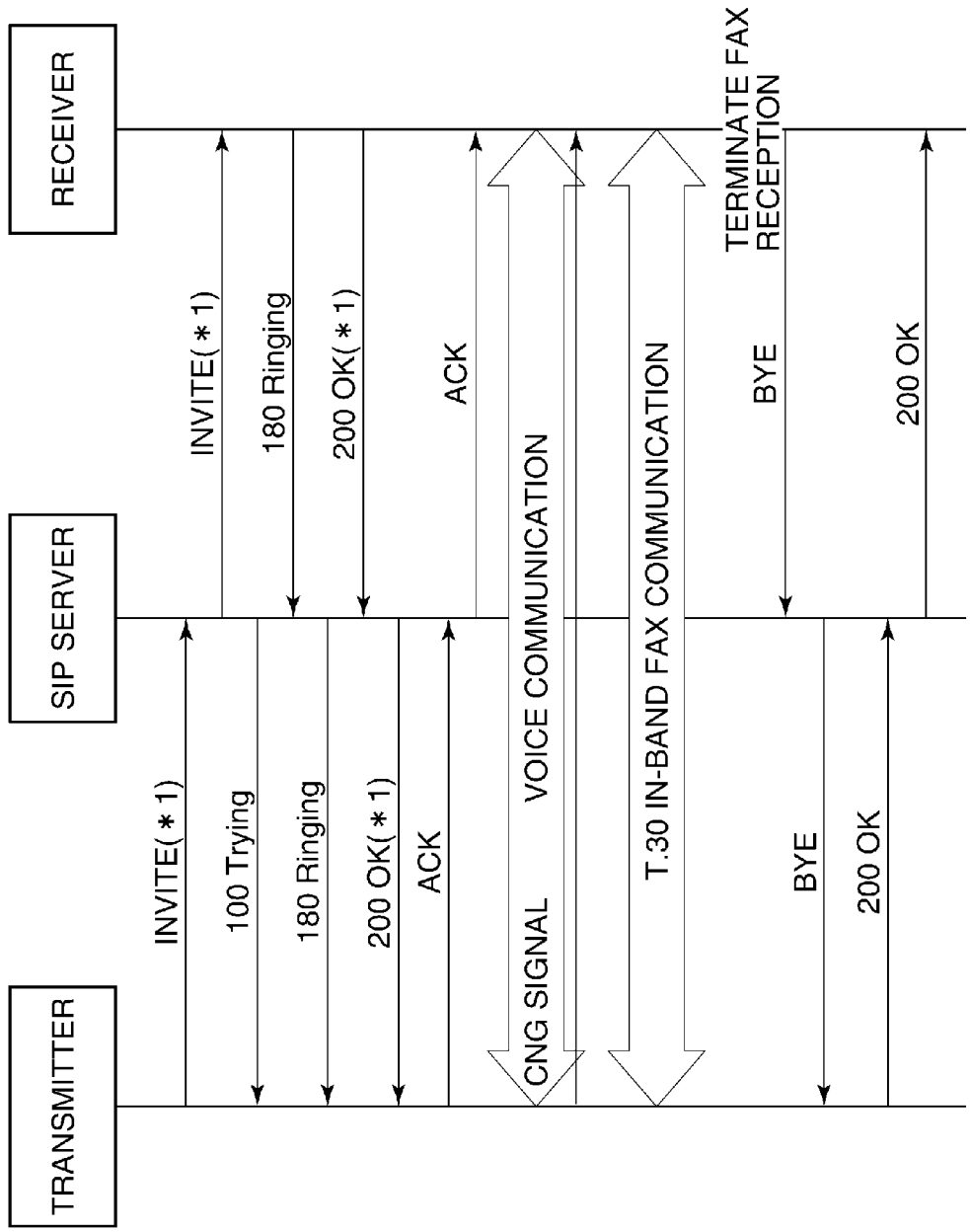
FIG. 12  T.30 IN-BAND FAX COMMUNICATION SEQUENCE

FIG. 13

INVITE SIGNAL IN CALL
FOR VOICE COMMUNICATION

> INVITE sip:bob@example.com SIP/2.0
>
> Via: SIP/2 0/UDP pc33.O×O.co.jp branch=z9hG4bKnashds8
>
> Max-Forwards: 70
>
> To: Bob ⟨sip:bob@example.com⟩
>
> From: Alice ⟨sip:alice@ O×O .co.jp⟩;tag=1928301774
>
> Call-ID: a81b4c76e66710@pc33.O×O.co.jp
>
> CSeq: 314159 1NVITE
>
> Contact:<sip:alice@pc33.O×O.co.jp⟩
>
> Conten-Typei application/sdp
>
> Content-Length: 153
>
>
> v=0
>
> o=alice 53655765 2353687637 1N IP4 pc33.O×O .co.jp
>
> s=-
>
> t=0 0
>
> m=audio 5004 RTP/AVP 0
>
> a=rtpmap:8 PCMU/8000

IMAGE COMMUNICATION APPARATUS CAPABLE OF PERFORMING FACSIMILE COMMUNICATION VIA IP NETWORK, METHOD OF CONTROLLING THE SAME, AND STORAGE MEDIUM

TECHNICAL FIELD

The present invention relates to an image communication apparatus that is capable of performing voice communication and in-band facsimile communication, a method of controlling the same, and a storage medium.

BACKGROUND ART

Conventional image communication methods include not only facsimile transmission (hereinafter simply referred to as the "FAX") using a public telephone line (PSTN), but also FAX transmission using a high-speed network, such as an IP network. The method of FAX transmission using the IP network includes two types. One type is used in T.30 in-band communication using an ITU-T Recommendation T.30 protocol. This method transmits a T.30 analog signal after converting the same to a digital signal. The T.30 analog signal is transmitted by deeming the same as a voice signal and the method is called T.30 in-band FAX communication. The other type is a transmission method defined by ITU-T Recommendation T.38. This method transmits a signal transmitted using the T.30 protocol directly as a digital signal, and the signal can be transmitted at a higher speed than by T.30 FAX transmission.

These two methods both use an SIP (session initiation protocol) as call control means, and realize Point-to-Point transmission on the IP network (PTL 1). Further, the IP network includes e.g. a digital subscriber line called the NGN (next generation network) provided by Nippon Telegraph and Telephone Corporation in Japan, and a private IP line using an IP private branch exchange (IP-PBX). Particularly, when the NGN is used, bandwidth guarantee, security management, etc. are performed, and hence, it is possible to transmit images at a high speed and with security.

Although the maximum transmission speed in the conventional PSTN is 33.6 kbps, the maximum 1 Mbps is guaranteed in the NGN, i.e. it is possible to transfer data approximately 30 times faster than in the PSTN. For an image communication apparatus that is capable of performing the above-described T.38 FAX communication and T.30 in-band FAX communication, there has been proposed a method of configuring an operation of the telephone system, on the IP network. This makes it unnecessary to connect to the PSTN, but enables the image communication apparatus to perform voice communication and FAX communication only by network connection. In this case, a handset and a child phone are also connected to the IP network similarly to the FAX communication, and voice data is exchanged by passing voice packets through the IP network. This is a so-called IP telephone. A method of encrypting voice packets on the IP telephone is based on ITU-T Recommendation G.711, and an RTP (real time protocol) is used as a transmission protocol. Also in such an image communication apparatus, it is necessary to support various reception modes of a conventional facsimile connected to an analog telephone line, and a remote reception function in a telephone operation in a manual reception mode. The above-mentioned various reception modes include an automatic reception mode, an answerphone (answering machine) connection mode, a FAX/TEL-switching mode, and a manual reception mode (PTL 2).

In the automatic reception mode, the image communication apparatus automatically starts FAX reception upon receipt of a call, without causing an operator to respond using a handset or a child phone connected to the apparatus.

The answerphone connection mode is selected when a telephone having an answerphone function is connected as a child phone. In the answerphone connection mode, the apparatus is automatically switched to FAX reception when an initial identification signal (CNG (calling tone) signal in a FAX procedure) is detected during execution of unattended recording by the answerphone.

In the FAX/TEL-switching mode, it is automatically determined whether a received voice call is for FAX transmission or voice communication. In the FAX/TEL-switching mode, if a CNG signal is detected after the call is once connected to the FAX function, FAX reception is automatically started, whereas if not, the handset or the child phone is caused to ring to answer the call.

The manual reception mode only supports voice communication, and differently from the answerphone connection mode and the FAX/TEL-switching mode, in the manual reception mode, the apparatus is not automatically switched to FAX reception. However, if the apparatus has the remote reception function, the apparatus can be switched to FAX reception according to an instruction from a user. The remote reception function is to have the apparatus main unit switched to FAX reception in response to an operation (predetermined dialing) from a telephone connected thereto.

In an image communication apparatus which is connected to the IP network and has the function of performing FAX communication (T.38 FAX communication and T.30 in-band FAX communication) and voice communication over the IP network, calls are received in the above-mentioned various kinds of reception modes. In this case, reception of a call for T.38 FAX communication and reception of a call for T.30 in-band FAX communication can be distinguished from each other based on a media attribute provided by a caller for use in the SIP procedure. Reception of a call is notified by a SIP INVITE signal, and the notification includes the media attribute (definition by "m=" included in the INVITE signal). Definition of "m=audio" indicates reception of a call for T.30 in-band communication or voice communication, and definition of "m=image" or "m=application" indicates reception of a call for T.38 FAX communication. Therefore, when a call for T.38 FAX communication is received, even when the reception mode is set to any mode, the apparatus can be automatically switched to T.38 FAX reception.

However, reception of a call for T.30 in-band communication and reception of a call for voice communication have the same media attribute, and hence cannot be distinguished from each other. For this reason, to switch the apparatus to FAX reception in the answerphone connection mode and the FAX/TEL-switching mode, it is necessary to determine whether or not the call is for FAX communication after connecting the call.

In a case where a call is received by using the conventional analog telephone line, if the reception mode is the answerphone connection mode or the FAX/TEL-switching mode, a voice signal on the line is transmitted to a FAX communication controller that controls FAX communication. The FAX communication controller is a so-called MODEM (modulator-demodulator).

Then, a CNG signal is identified using a filter function of the MODEM, and when the CNG signal is detected, the apparatus is automatically switched to FAX reception. Also in the image communication apparatus capable of performing T.30 in-band communication and voice communication over the IP network, CNG detection is similarly required.

CITATION LIST

Patent Literature

PTL 1: JP 2004-187262 A
PTL 2: JP H05-095439 A

SUMMARY OF INVENTION

Technical Problem

To realize a telephone function by connecting to the IP network, a telephone controller for connecting between a telephone and an IP network, i.e. SLIC (subscriber line interface circuit: also referred to as the subscriber line connection circuit) is used. The SLIC is mainly used for identifying a dial signal from a telephone, controlling ringing of a telephone, detecting hooking of a telephone, and so forth. Although the SLIC is a device that is essential to realization of an IP telephone, this device is absolutely made for a telephone, and is not equipped with a function for the above-described FAX communication, more specifically, a function of detecting a CNG signal used for switching to FAX reception.

Therefore, it is not possible to realize automatic switching to FAX reception in the answerphone connection mode and the FAX/TEL-switching mode, only by using the SLIC.

Further, in a case where the apparatus is not equipped with the remote reception function, a means is provided for detecting a dial signal from a child phone when a call using the conventional analog telephone line is received, and the apparatus is switched to FAX reception when a predetermined dial signal is detected.

Dialing from a child phone is performed by a DTMF (dual tone multi-frequency) signal. The image communication apparatus capable of performing T.30 in-band communication and voice communication over the IP network is also required to be equipped with the remote reception function, and in this case, a means for detecting a DTMF signal from a child phone is required. The above-mentioned SLIC has the DTMF detection function, which can be used for DTMF detection, but no conventional means has been provided which switches the apparatus to FAX reception when a DTMF signal is detected.

The present invention provides a technique that enables an image communication apparatus capable of performing voice communication and T.30 in-band FAX communication over the IP network to positively detect a CNG signal and achieve switching to FAX reception in the answerphone connection mode and the FAX/TEL-switching mode.

Solution to Problem

Accordingly, in a first aspect of the present invention, there is provided a communication apparatus that executes communication via an IP network, comprising a facsimile controller configured to control facsimile communication, a telephone controller configured to control a telephone, a first connection unit configured to connect the IP network and the facsimile controller, a second connection unit configured to connect the IP network and the telephone controller, and a connection control unit configured to control the first connection unit and the second connection unit such that signals from the IP network are supplied to both of the facsimile controller and the telephone controller.

Accordingly, in a second aspect of the present invention, there is provided a method of controlling a communication apparatus that executes communication via an IP network, including a facsimile controller for controlling facsimile communication, a telephone controller for controlling a telephone, a first connection unit for connecting the IP network and the facsimile controller, and a second connection unit for connecting the IP network and the telephone controller, comprising controlling the first connection unit and the second connection unit such that signals from the IP network are supplied to both of the facsimile controller and the telephone controller.

Accordingly, in a third aspect of the present invention, there is provided a non-transitory computer-readable storage medium storing a computer-executable control program for causing a computer to execute a method of controlling a communication apparatus that executes communication via an IP network, including a facsimile controller for controlling facsimile communication, a telephone controller for controlling a telephone, a first connection unit for connecting the IP network and the facsimile controller, and a second connection unit for connecting the IP network and the telephone controller, wherein the method comprises controlling the first connection unit and the second connection unit such that signals from the IP network are supplied to both of the facsimile controller and the telephone controller.

Advantageous Effects of Invention

According to the present invention, an image communication apparatus capable of performing voice communication and T.30 in-band FAX communication is enabled to positively detect a CNG signal and achieve switching to FAX reception in the answerphone connection mode and the FAX/TEL-switching mode. Further, also when the remote reception is set, the apparatus is enabled to positively switch to FAX reception.

Further features of the present invention will become apparent from the following description of exemplary embodiments with reference to the attached drawings.

BRIEF DESCRIPTION OF DRAWINGS

FIG. 5 is a flowchart of an answerphone connection mode process executed in a step in FIG. 3.

FIG. 9 is a diagram showing an example of respective connection states of switches of the selector in each reception mode of the image communication apparatus.

FIG. 11 is a diagram showing an example of an INVITE signal used in T.38 FAX communication.

FIG. 12 is a diagram showing an example of a protocol sequence of in-band FAX communication.

FIG. 13 is a diagram showing an example of an INVITE signal received when a call for voice communication is received.

DESCRIPTION OF EMBODIMENTS

The present invention will now be described in detail below with reference to the drawings showing an embodiment thereof.

Figure 1:
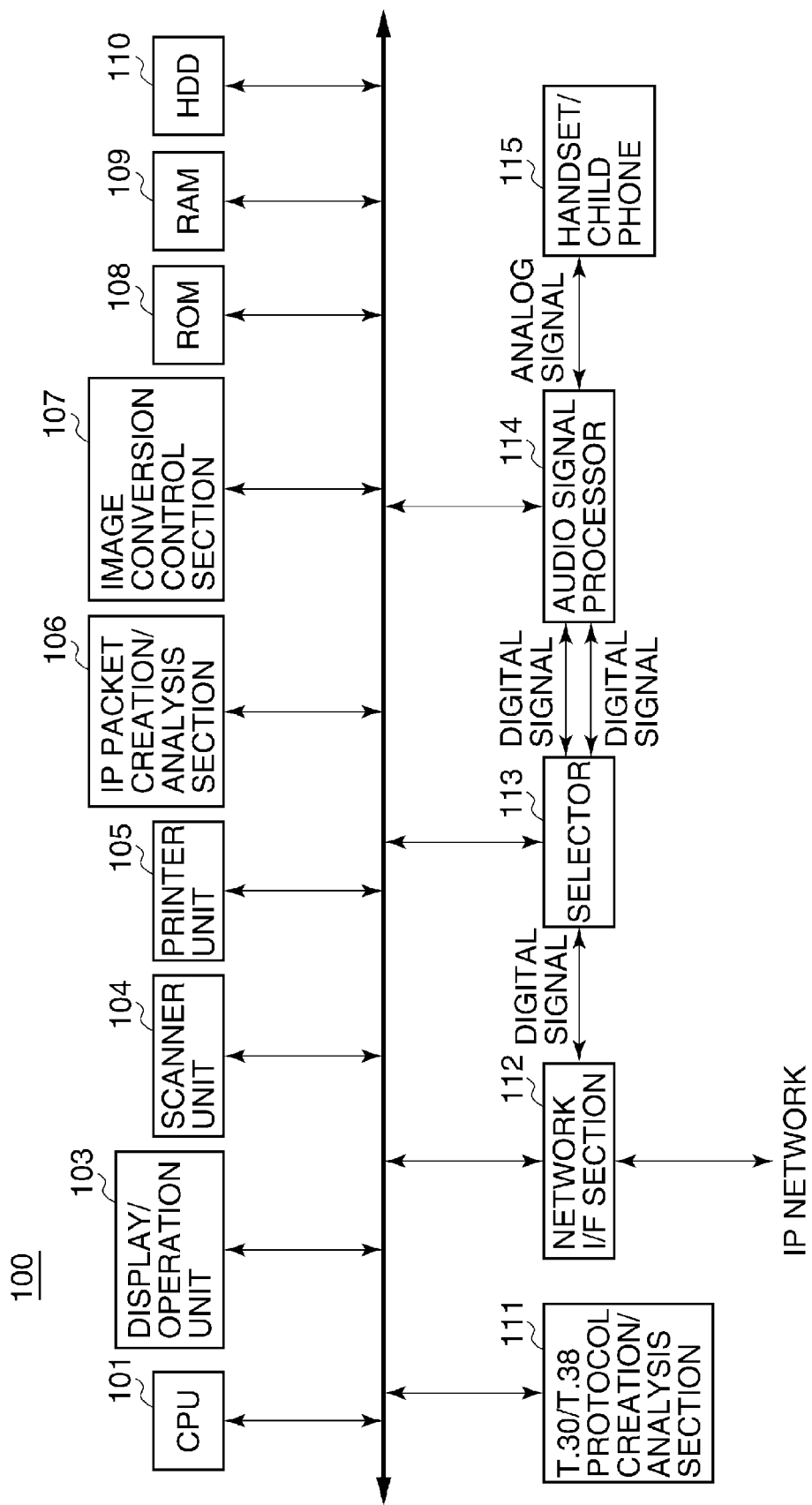
FIG. 1 is a schematic diagram of an image communication apparatus according to an embodiment of the present invention.

FIG. 1 is a schematic diagram of an image communication apparatus according to an embodiment of the present invention.

In FIG. 1, the image communication apparatus, denoted by reference numeral 100, is capable of performing the voice communication and in-band FAX communication over the IP network, described hereinabove.

A CPU 101 controls devices included in the image communication apparatus 100 based on control programs stored in a ROM 108. A display/operation unit 103 displays e.g. windows, icons, messages, menus, and other user interface information. Further, the display/operation unit 103 includes, though not shown, various keys for a user to perform operations for copy, FAX, and print, a screen for enabling the user to operate e.g. icons and menus on a display screen, a pointing device, and so forth.

A scanner unit 104 reads an original. A printer unit 105 prints print data stored in a RAM 109 or a HDD (hard disk drive) 110. The ROM 108 is a memory storing various control programs and data. The RAM 109 is a memory which provides a work area used by the CPU 101, an area for saving data in error handling, an area for loading the control programs, and so forth. The HDD 110 is a storage device that stores various control programs and print data.

A T.30/T.38 protocol creation/analysis section 111 has a function of generating facsimile transmission information using an ITU-T Recommendation T.30/T.38 protocol, and retrieving facsimile transmission information from the received protocol. An IP packet creation/analysis section 106 has a function of mapping the ITU-T Recommendation T.30/T.38 protocol to IP packets, and retrieving the ITU-T Recommendation T.30/T.38 protocol from received IP packets. An image conversion control section 107 performs compression/decompression, scaling, and linear density conversion on an image to be transmitted by FAX communication.

A network interface section 112 is called the NIC (network interface controller), and is connected to the IP network. A selector 113 is a selection-switching connection unit configured to selectively switch and connect signal lines for inputting and outputting signals between the NIC 112 and an audio signal processor 114.

The audio signal processor 114 includes a telephone controller (SLIC) for encoding/decoding an audio signal and connecting a telephone, and a FAX communication controller (modulator-demodulator (MODEM)) for transmitting and receiving a FAX signal.

Further, in the audio signal processor 114, a signal from the telephone controller (SLIC) is supplied to a handset/child phone 115 in the case of voice communication. In the case of T.30 in-band FAX communication, signal processing is performed by the FAX communication controller (MODEM) of the audio signal processor 114.

Next, the internal arrangement of the selector 113 and the audio signal processor 114 will be described with reference to FIG. 2.

Figure 2:
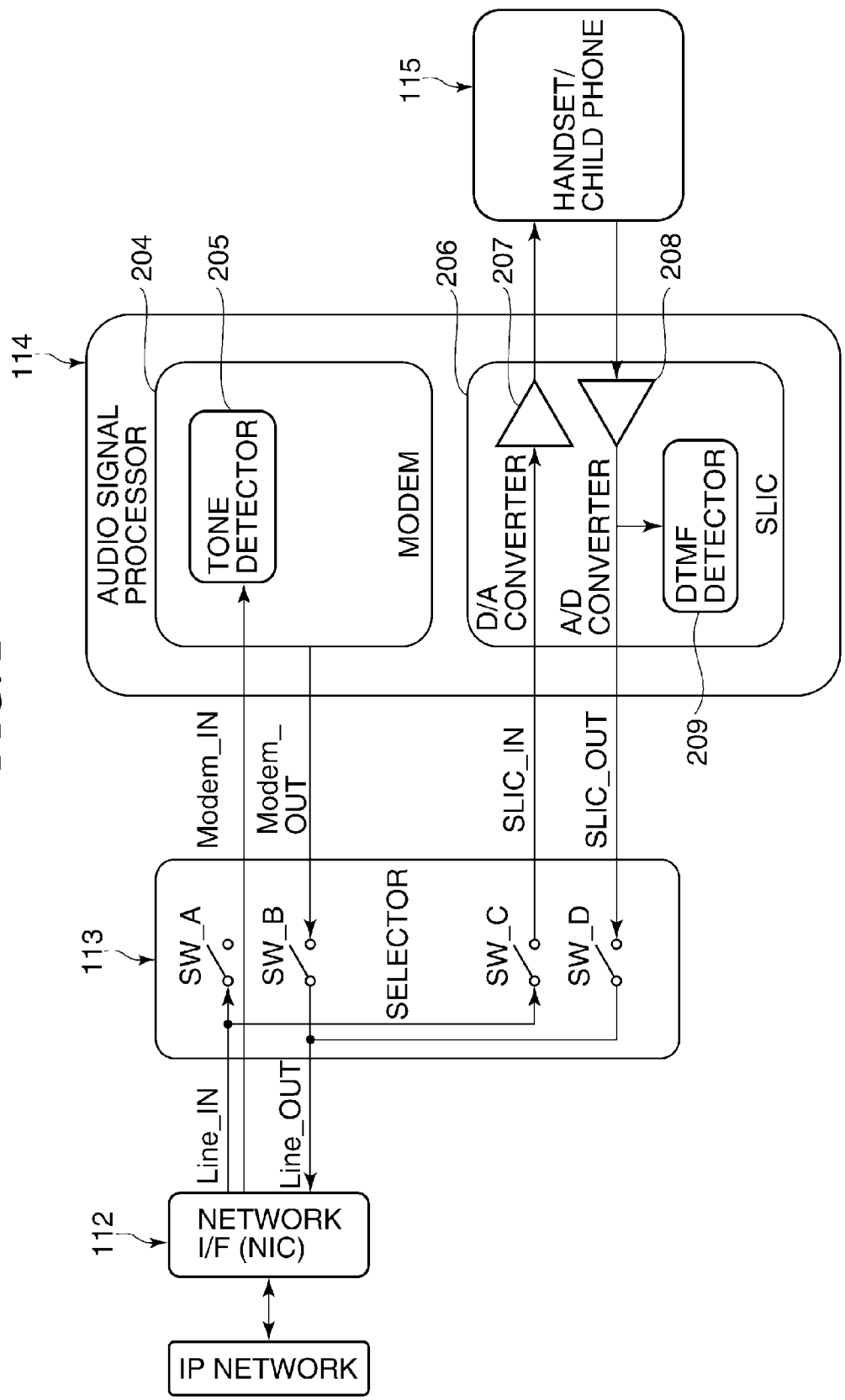
FIG. 2 is a schematic diagram of a selector and an audio signal processor.

FIG. 2 is a schematic diagram of the selector 113 and the audio signal processor 114.

The selector 113 is the selection-switching connection unit, as mentioned hereinabove, which selectively transfers a signal between the NIC 112 and the audio signal processor 114, and includes switches SW_A, SW_B, SW_C, and SW_D, as shown in FIG. 2.

The audio signal processor 114 includes the telephone controller (SLIC), denoted by reference numeral 206, and the FAX communication controller (MODEM), denoted by reference numeral 204. The SLIC 206 includes a digital-to-analog converter 207 and an analog-to-digital converter 208 which are codecs of e.g. G.711, and a DTMF detector 209. Besides these components, the SLIC 206 includes a controller part, not shown, for controlling e.g. ringing of the handset/child phone 115. The MODEM 204 includes a tone detector 205. The MODEM 204 further includes e.g. a modulating/demodulating section, not shown.

Usually, in the case of an analog telephone line, a signal on the line side of a MODEM used for FAX communication is an analog signal. However, the MODEM 204 appearing in FIG. 2 is connected to a digital network, such as an IP network, and hence is configured as a digital MODEM connected to the IP network side for directly exchanging digital signals.

An input signal from the IP network intended to the device is input from the NIC 112 to the selector 113 as a Line_IN signal. On the other hand, an output signal from the device to the IP network is output from the selector 113 to the NIC 112 as a Line_OUT signal.

The selector 113 controls selective connection of the signal line for the Line_IN signal and the signal line for the Line_OUT signal to the MODEM 204 or to the SLIC 206 of the audio signal processor 114. This control is performed using the switches SW_A, SW_B, SW_C, and SW_D.

When a user talks using the handset/child phone 115, the switches SW_C and SW_D are closed (ON), whereby an input signal from the IP network and an output signal to the IP network are input to and output from the SLIC 206 of the audio signal processor 114. At this time, the switches SW_A and SW_B are in an open state (OFF). On the other hand, when in-band FAX communication is executed using the MODEM 204, the switches SW_A and SW_B are closed (ON), and the input signal from the IP network and the output signal to the IP network are input to and output from the MODEM 204 of the audio signal processor 114. At this time, the switches SW_C and SW_D are in an open state (OFF).

Figure 3:
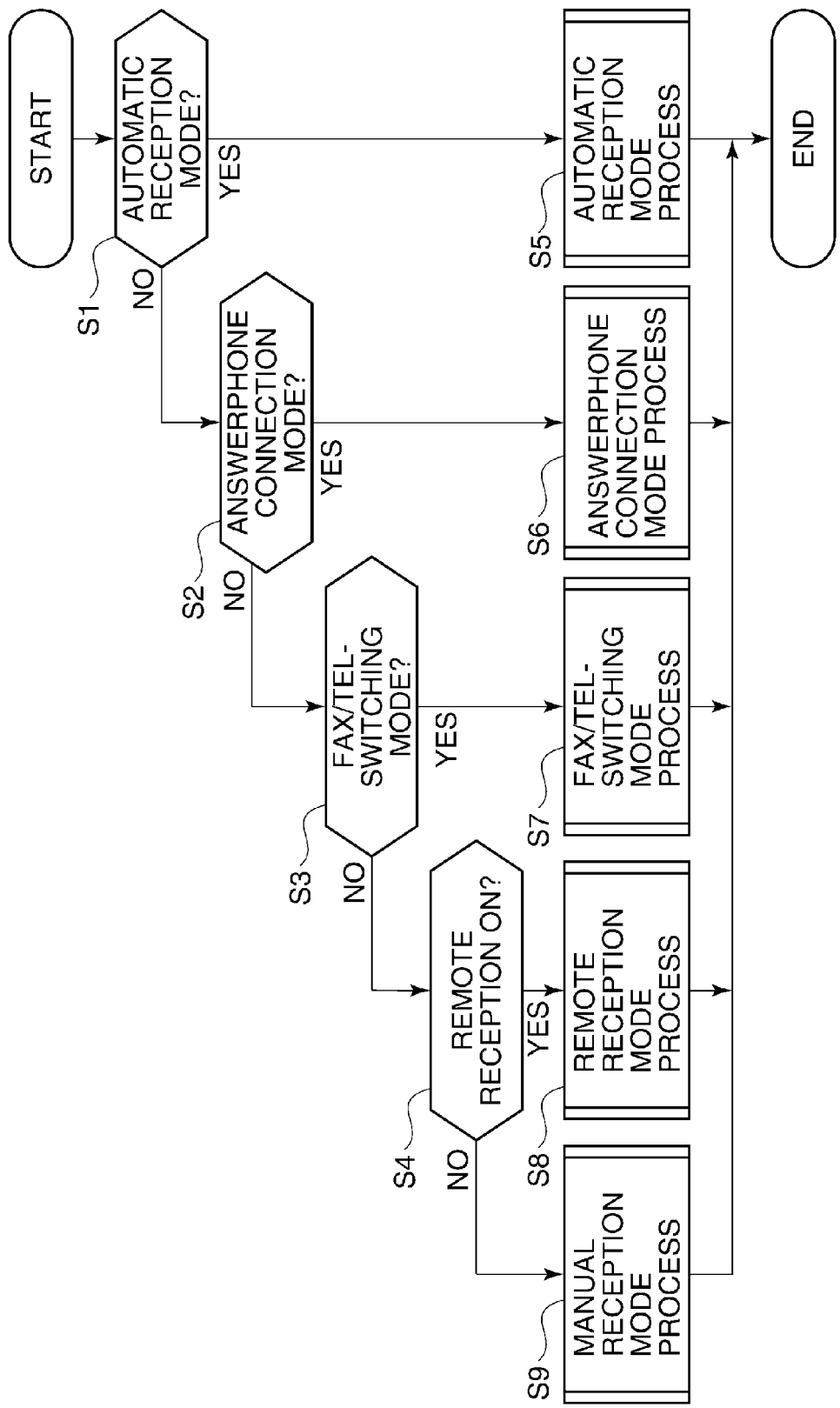
FIG. 3 is a flowchart of a reception determination process for determining various reception modes and a remote reception setting of the image communication apparatus shown in FIG. 1.

FIG. 3 is a flowchart of a reception determination process for determining various reception modes and a remote reception setting of the image communication apparatus 100 shown in FIG. 1. Steps of the reception determination process described hereafter are executed by the CPU 101 based on a program code loaded from the HDD 110 into the RAM 109, unless otherwise specified.

In a step S1, the CPU 101 determines whether or not the reception mode is the automatic reception mode. If it is determined that the reception mode is the automatic reception mode, the CPU 101 executes an automatic reception mode process in a step S5. On the other hand, if it is determined that the reception mode is not the automatic reception mode, the CPU 101 proceeds to a step S2.

In the step S2, the CPU 101 determines whether or not the reception mode is the answerphone connection mode. If it is determined that the reception mode is the answerphone connection mode, the CPU 101 executes an answerphone connection mode process in a step S6. On the other hand, if it is determined that the reception mode is not the answerphone connection mode, the CPU 101 proceeds to a step S3.

In the step S3, the CPU 101 determines whether or not the reception mode is the FAX/TEL-switching mode. If it is determined that the reception mode is the FAX/TEL-switching mode, the CPU 101 executes a FAX/TEL-switching mode process in a step S7. On the other hand, if it is determined that the reception mode is not the FAX/TEL-switching mode, the CPU 101 judges that the manual reception mode is set, and proceeds to a step S4.

In the step S4, the CPU 101 determines whether or not the remote reception is set i.e. is enabled, and if it is determined that the remote reception is set i.e. is enabled, the CPU 101 executes a remote reception mode process in a step S8. On the other hand, if it is determined that the remote reception is not set i.e. is not enabled, the CPU 101 executes a manual reception mode process in a step S9.

Next, the processes executed in the steps 5 to 9 in FIG. 3 will be described.

Figure 4:
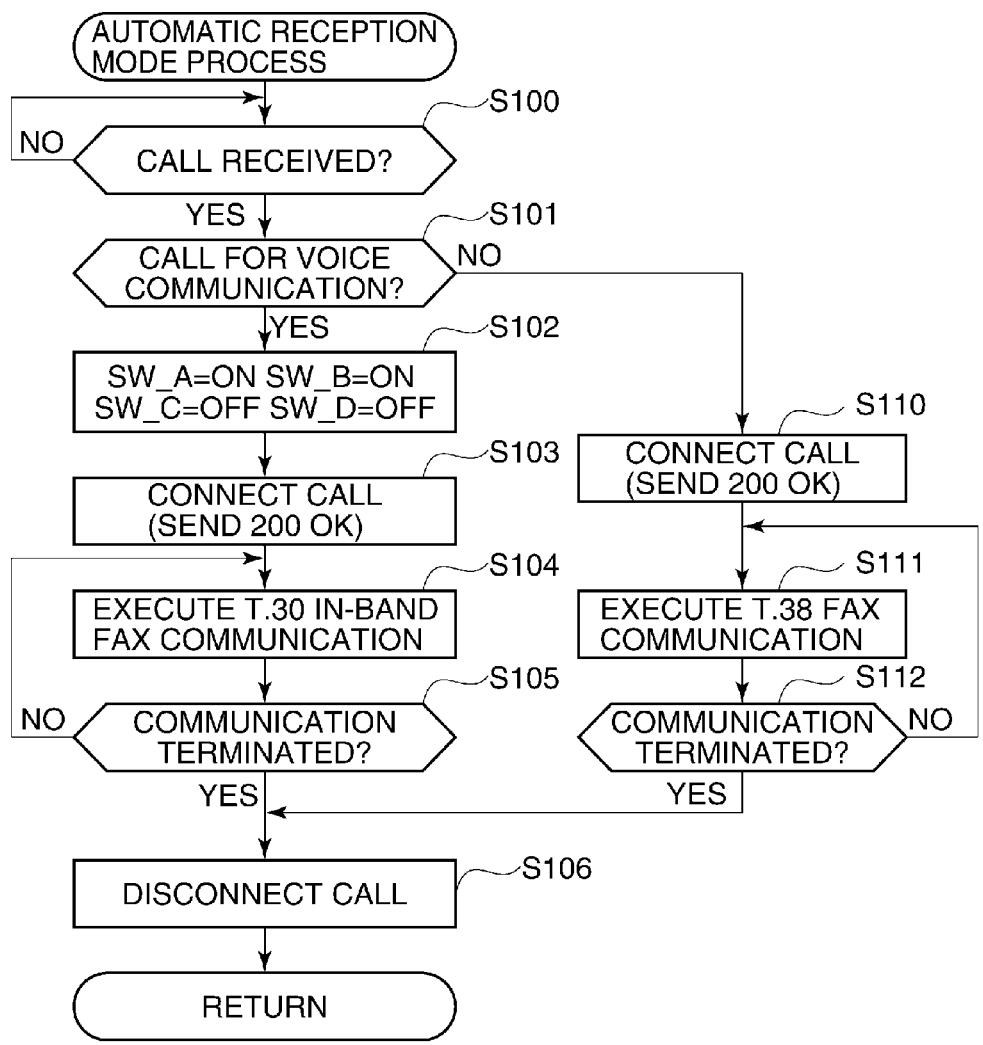
FIG. 4 is a flowchart of an automatic reception mode process executed in a step in FIG. 3.

FIG. 4 is a flowchart of the automatic reception mode process executed in the step S5 in FIG. 3.

In FIG. 4, first, in a step S100, the CPU 101 determines whether or not a call has been received. Reception of a call means reception of a SIP INVITE signal from the IP network. Whether or not the INVITE signal has been received is determined by the CPU 101 based on a signal from the NIC 112. If it is determined that a call has not been received, the CPU 101 waits for a call, whereas if a call has been received, the CPU 101 proceeds to a step S101.

In the step S101, the CPU 101 determines whether the received call is for voice communication or data communication. This is determined according to a media attribute (definition by "m=") included in the INVITE signal. FIG. 11 shows the INVITE signal received when the call is for data communication (T.38), and FIG. 13 shows the INVITE signal received when the call is for voice communication. Description after "m=" in illustrated data strings indicates the media attribute. When the media attribute is defined as "m=application" or "m=image", this indicates data communication, and when the media attribute is defined as "m=audio", this indicates voice communication. The CPU 101 thus determines whether the received call is for voice communication or data communication.

If it is determined in the step S101 that the received call is for data communication (NO to the step S101), the CPU 101 proceeds to a step S110, wherein the call is connected. Connection of the call is performed by sending a "200 OK signal" using an SIP protocol, described hereinafter, to the IP network.

Next, in a step S111, T.38 FAX communication is started, and the CPU 101 determines in a step S112 whether or not FAX communication is terminated. If it is determined that FAX communication is terminated, the CPU 101 disconnects the call in a step S106, and returns. On the other hand, if it is determined in the step S112 that FAX communication is not terminated, the CPU 101 returns to the step S111, and T.38 FAX communication is continued. A protocol sequence of T.38 FAX communication is shown in FIG. 10.

Figure 10:
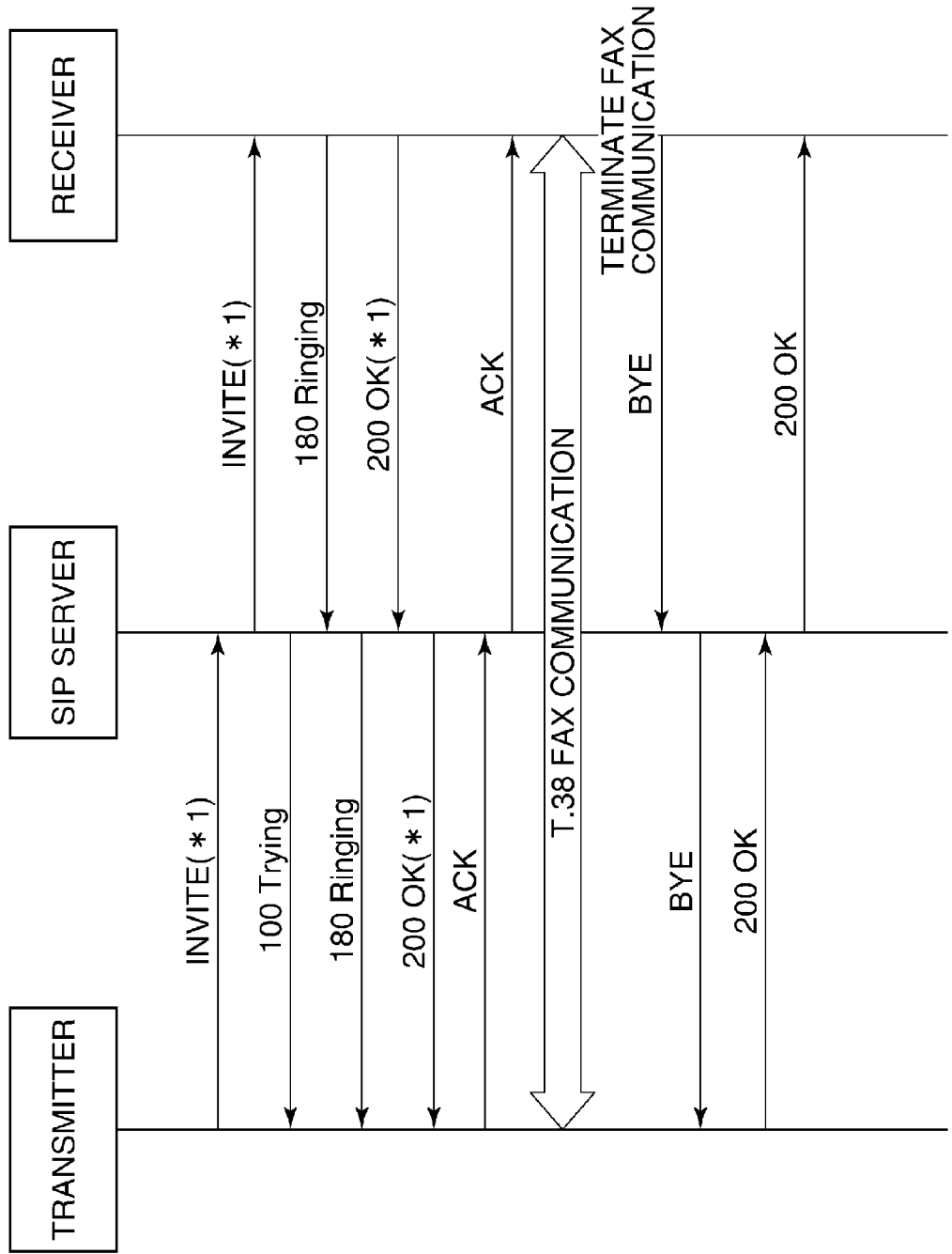
FIG. 10 is a diagram showing an example of a protocol sequence of T.38 FAX communication.

Referring to FIG. 10, exchange of SIP signals is usually performed via a SIP server. When a call is initiated from a transmitter, an INVITE signal is sent to the SIP server, and further, the SIP server outputs the INVITE signal to a receiver side. A receiver receives the INVITE signal, and outputs, if the INVITE signal is acceptable, a "180 Ringing" signal indicating that a telephone is ringing, to the SIP server. Further, the receiver outputs a "200 OK" signal when the call has been accepted. The "180 Ringing" signal and the "200 OK" signal are sent to the transmitter via the SIP server. Further, the transmitter sends an ACK signal as a response to the "200 OK" signal to the receiver via the SIP server. After this process, the transmitter and the receiver are connected in one-to-one relationship, whereby T.38 FAX communication is performed. When the communication is terminated, the receiver sends a SIP BYE signal to the transmitter via the SIP server, and the transmitter sends the "200 OK" signal as a response to the BYE signal to the receiver via the SIP server, whereby the call is disconnected.

Referring again to FIG. 4, if it is determined in the step S101 in FIG. 4 that the received call is for voice communication, the signal lines from the IP network to the audio signal processor 114 are connected to the MODEM 204 so as to start T.30 in-band FAX communication (step S102). This is performed by closing the switches SW_A and SW_B of the selector 113 (ON). At this time, the switches SW_C and SW_D are in the open state (OFF).

Next, the call is connected in a step S103. Similar to T.38 FAX communication, connection of the call is performed by sending the SIP "200 OK" signal to the IP network. Next, T.30 in-band FAX communication is started in a step S104, and is continued until it is determined in a step S105 that the communication is terminated. If it is determined in the step S105 that the communication is terminated, the CPU 101 disconnects the call in the step S106, and returns. The call connection and communication in T.30 in-band FAX communication differs from those of T.38 FAX communication in that the media attribute of the INVITE signal shown in FIG. 11 is "m=audio", and T.38 FAX communication in the communication sequence shown in FIG. 10 is replaced by T.30 in-band FAX communication.

As described above, when a call is received in the automatic reception mode, first, whether the received call is for T.38 FAX communication or T.30 in-band FAX communication is determined according to a media attribute included in the INVITE signal, whereby the apparatus is caused to properly shift to FAX reception.

FIG. 5 is a flowchart of the answerphone connection mode process executed in the step S6 in FIG. 3.

Referring to FIG. 5, first, in a step S200, the CPU 101 determines whether or not a call has been received. The step S200 is the same as the step S100 in FIG. 4. If it is determined that a call has not been received, the CPU 101 waits for a call, whereas if a call has been received, the CPU 101 proceeds to a step S201.

In the step S201, the CPU 101 determines whether the received call is for voice communication or data communication. The determination in the step S201 is performed according to a media attribute included in the SIP INVITE signal, similarly to the step S101 in FIG. 4.

If it is determined in the step S201 that the received call is for data communication, the CPU 101 proceeds to a step S220 to connect the call (sends a SIP "200 OK" signal to the IP network). The step S220 and steps S221 and S222 are the same as the steps S110 to S112 in FIG. 4.

On the other hand, if it is determined in the step S201 that the received call is for voice communication, the CPU 101 proceeds to a step S202, wherein the CPU 101 causes the handset/child phone 115 to ring so as to notify the user of reception of the call using a telephone ringing function of the SLIC 206. Next, in a step S203, the CPU 101 determines using a function of the SLIC 206 whether or not the handset/child phone 115 has been hooked up. If it is determined that the handset/child phone 115 has not been hooked up, the CPU 101 returns to the step S202, and continues to cause the handset/child phone 115 to ring. On the other hand, if it is determined that the handset/child phone 115 has been hooked up, the CPU 101 proceeds to a step S204.

In the step S204, the CPU 101 stops causing the handset/child phone 115 to ring using the function of the SLIC 206, and connects the signal lines from the IP network to the audio signal processor 114, to the SLIC 206, using the selector 113, so as to enable voice communication using the handset/child phone 115 in a step S205.

Further, in the step S205, to perform voice communication and detection of a FAX initial identification signal (detection of a CNG signal) simultaneously, the signal lines for signals input from the IP network are connected to the MODEM 204. More specifically, the switches SW_A, SW_C, and SW_D of the selector 113 are closed (ON). This parallel connection makes it possible to detect a CNG signal by the MODEM 204 during voice communication. At this time, the switch SW_B is in the open state (OFF). This is to prevent an unnecessary signal from the MODEM 204 from flowing into the IP network.

In the conventional telephone line, an audio signal on the telephone line is used for CNG detection, and a CNG signal is detected from signals in which upstream and downstream signals are mixed, and hence noise is generated, which lowers the detection accuracy. In the present invention, upstream and downstream signals are not mixed, and a CNG signal can be detected from received signals which are digitally separated, and hence it is possible to largely improve the detection accuracy.

Next, in a step S206, CNG detection by the MODEM 204 is started. In a step S207, the SIP "200 OK" signal is sent to the IP network, and the call is connected, and voice communication is started in a step S208. Voice communication is performed by alternately converting digital signals from the IP network and analog signals from the handset/child phone 115 by the digital-to-analog converter 207 and the analog-to-digital converter 208 of the SLIC 206, respectively. In this voice communication, the answerphone function of the handset/child phone 115 sends an automatic message as a response.

After connection of the call, in a step S209, the CPU 101 determines whether or not a CNG signal has been detected by the MODEM 204, and if a CNG signal has not been detected, the CPU 101 determines in a step S214 whether or not the voice communication is terminated. If it is determined that the voice communication is terminated, the CPU 101 disconnects the call in a step S213, and returns. On the other hand, if it is determined in the step S214 that the voice communication is not terminated, the CPU 101 returns to the step S208, and the voice communication is continued.

If a CNG signal is detected by the MODEM 204 in the step S209, the CPU 101 connects the signal lines from the IP network to the audio signal processor 114, to the MODEM 204 in a step S210. More specifically, the switches SW_A and SW_B of the selector 113 are closed (ON). Further, at this time, the switches SW_C and SW_D are in the open state (OFF). Subsequently, in a step S211, T.30 in-band FAX communication is started.

The CPU 101 determines in a step S212 whether or not the FAX communication is terminated, and if the FAX communication is terminated, the CPU 101 disconnects the call in the step S213, and returns. On the other hand, if it is determined in the step S212 that the FAX communication is not terminated, T.30 in-band FAX communication is continued in the step S211.

FIG. 12 shows a protocol sequence in the above-described answerphone connection mode. Part of the sequence from reception of a call to the start of voice communication is the same as that in the case of T.38 FAX communication described with reference to FIG. 10. The media attribute included in the INVITE signal in this case is "audio", and hence the apparatus is not switched to FAX communication, but voice communication is performed between the transmitter and the receiver which are connected in one-to-one relationship. If a CNG signal output from the transmitter is detected by the MODEM 204 of the receiver during this voice communication, the signal lines from the IP network to the audio signal processor 114 are connected to the MODEM 204 by the selector 113, and T.30 in-band FAX communication is started. Part of the sequence after termination of communication is the same as that shown in FIG. 10, and hence description thereof is omitted.

As described above, also in the answerphone connection mode, it is possible to positively detect a CNG signal during voice communication, and further, it is possible to easily switch to T.30 in-band FAX communication.

Figure 6A:
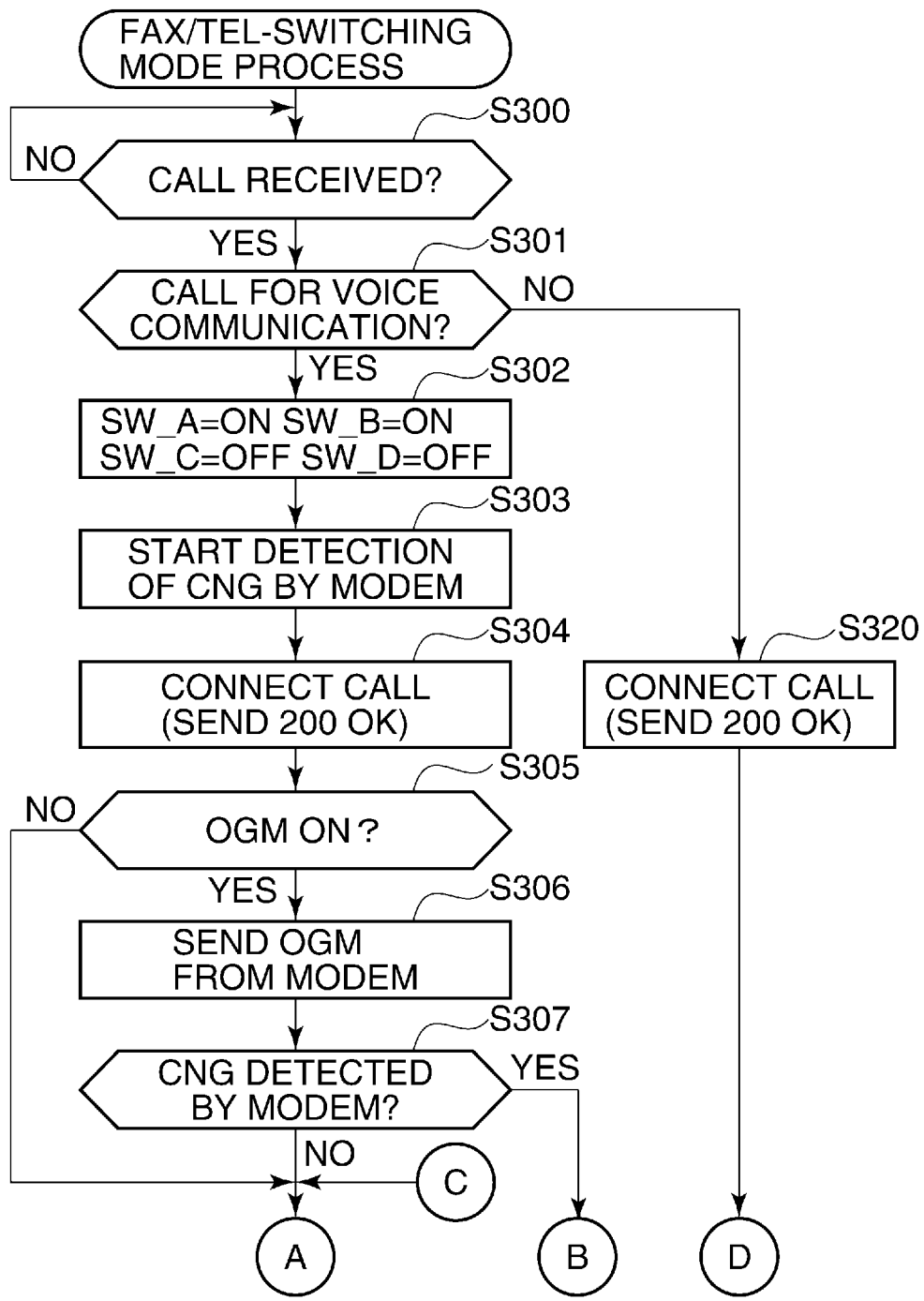
FIG. 6A is a flowchart of a FAX/TEL-switching mode process executed in a step in FIG. 3.
Figure 6B:
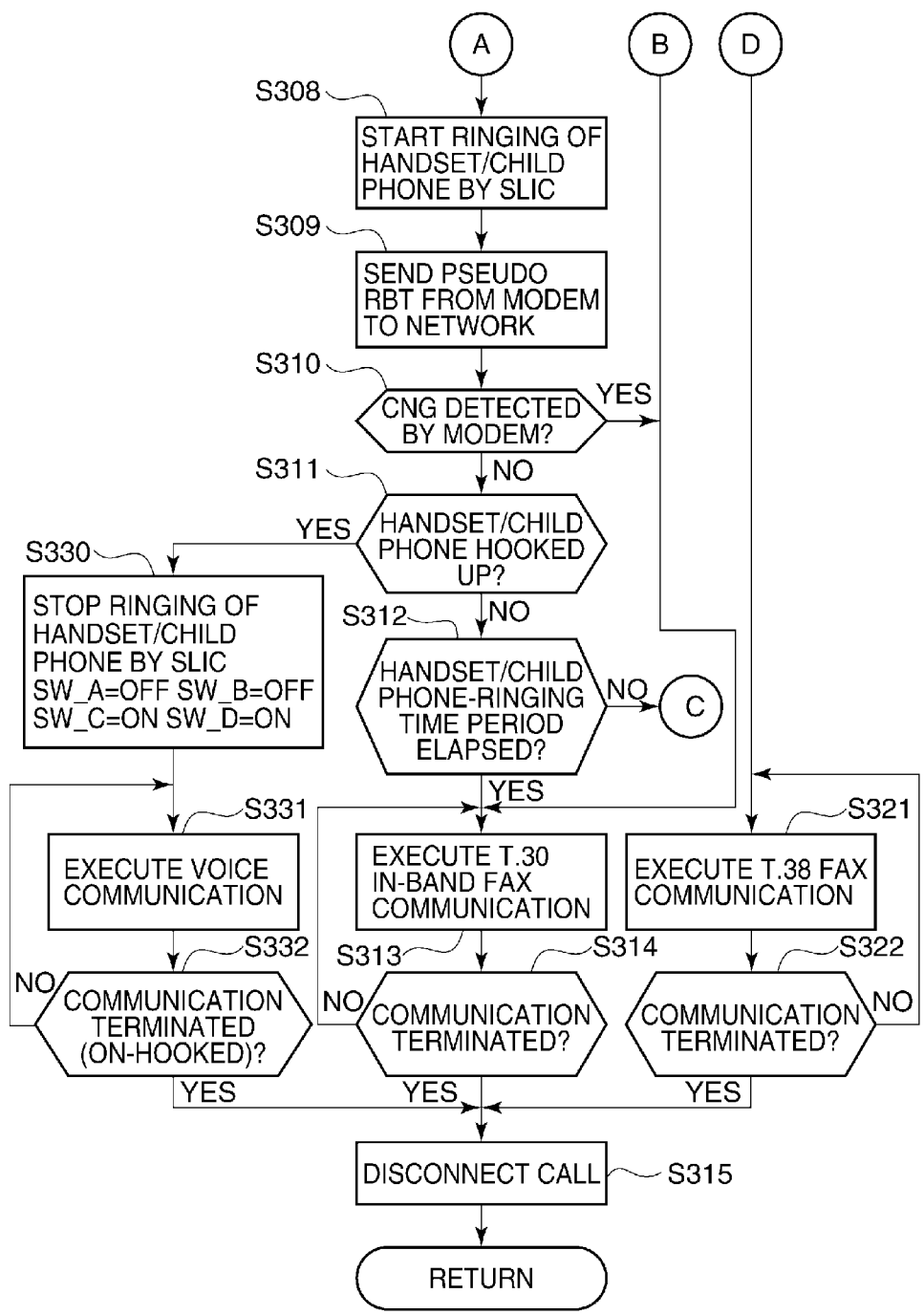
FIG. 6B is a continuation of FIG. 6A.

FIGS. 6A and 6B are a flowchart of the FAX/TEL-switching mode process executed in the step S7 in FIG. 3.

Referring to FIG. 6A, first, in a step S300, the CPU 101 determines whether or not a call has been received. The step S300 is the same as the step S100 in FIG. 4. If it is determined that a call has not been received, the CPU 101 waits for a call, whereas if a call has been received, the CPU 101 proceeds to a step S301.

In the step S301, the CPU 101 determines whether the received call is for voice communication or data communication. The determination in the step S301 is performed according to a media attribute included in the SIP INVITE signal, similarly to the step S101 in FIG. 4.

If it is determined in the step S301 that the received call is for data communication, the CPU 101 proceeds to a step S320 to connect the call (sends a SIP "200 OK" signal to the IP network). The step S320 in FIG. 6A and steps S321 and S322 in FIG. 6B are the same as the steps S110 to S112 in FIG. 4, and hence description thereof is omitted.

On the other hand, if it is determined in the step S301 that the received call is for voice communication, the CPU 101 proceeds to a step S302, wherein the CPU 101 connects the signal lines for respective input and output signals from and to the IP network, to the MODEM 204, and starts detection of a CNG signal by the MODEM 204 in a step S303. Then, in a step S304, the CPU 101 sends the SIP "200 OK" signal to the IP network to thereby connect the call.

Next, in a step S305, the CPU 101 determines whether or not OGM output is on. OGM is an acronym of Out Going Message, which is a voice message, such as a message of "Ringing is being performed. Please wait. To start Fax, begin transmission now." When the OGM function is on, the CPU 101 outputs an OGM signal from the MODEM 204 to the IP network in a step S306.

Next, in a step S307, the CPU 101 determines whether or not a CNG signal has been detected by the MODEM 204. If a CNG signal has been detected, the CPU 101 proceeds to a step S313 in FIG. 6B, wherein T.30 in-band FAX communication is started. Then, in a step S314 in FIG. 6B, CPU 101 determines whether or not the communication is terminated, and if the communication is terminated, the CPU 101 disconnects the call in a step S315 in FIG. 6B, and returns.

On the other hand, if it is determined in the step S307 that a CNG signal has not been detected, the CPU 101 proceeds to a step S308 in FIG. 6B, wherein the CPU 101 causes the handset/child phone 115 to ring using the telephone ringing function of the SLIC 206 so as to notify the user of reception of the call.

Next, in a step S309 in FIG. 6B, the CPU 101 sends a pseudo ringing back tone created by the MODEM 204 out to the IP network to thereby notify the transmitter side of ringing of the telephone. The ringing back tone is a so-called ringing tone which causes the transmitter to recognize that the telephone of the receiver is ringing. In this situation, since the call has been already connected, the ringing tone of the telephone is created in a pseudo manner, and is output to the IP network. Next, in a step S310, the CPU 101 determines whether or not a CNG signal has been detected by the MODEM 204. If a CNG signal has been detected, the CPU 101 proceeds to the step S313, whereas if not, the CPU 101 proceeds to a step S311.

In the step S311, the CPU 101 determines whether or not handset/child phone 115 has been hooked up by the function of the SLIC 206. If it is determined that the handset/child phone 115 has been hooked up, the CPU 101 stops causing the handset/child phone 115 to ring by the SLIC 206 in a step S330, and connects the signal lines for respective input and output signals from and to the IP network to the SLIC 206 (closes only the switches SW_C and SW_D of the selector 113 (ON)). This causes the communication state to be established for voice communication in a step S331. Subsequently, the CPU 101 determines whether or not the voice communication is terminated in a step S332, and if the voice communication is terminated, the CPU 101 disconnects the call in the step S315, and returns. On the other hand, if it is determined in the step S332 that the voice communication is not terminated, the voice communication in the step S331 is continued.

If hookup of the handset/child phone 115 has not been detected in the step S311, the CPU 101 determines whether or not a handset/child phone-ringing time period has elapsed in a step S312. Note that the handset/child phone-ringing time period has been set in advance. If no response is received even when the handset/child phone-ringing time period has elapsed, the CPU 101 automatically causes the apparatus to shift to FAX reception.

If it is determined in the step S312 that the handset/child phone-ringing time period has elapsed, T.30 in-band FAX communication is performed in the step S313. Subsequently, if it is determined in the step S314 that the communication is terminated, the CPU 101 disconnects the call in the step S315, and returns.

As described above, also in the answerphone connection mode, it is possible to positively detect a CNG signal, and easily switch the apparatus to T.30 in-band FAX communication.

Figure 7:
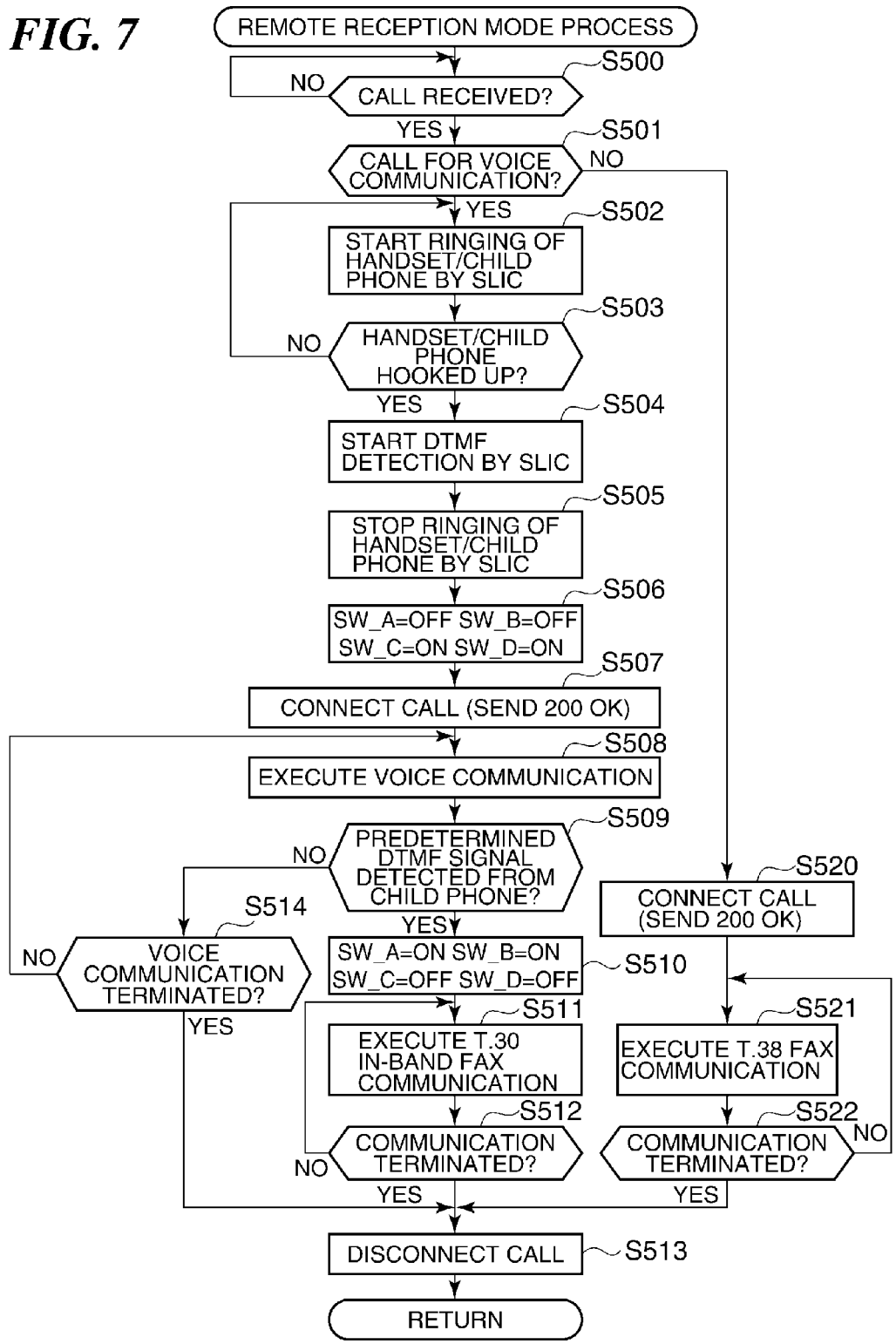
FIG. 7 is a flowchart of a remote reception mode process executed in a step in FIG. 3.

Next, the manual reception mode process will be described. In the manual reception mode, the operation is different depending on whether the remote reception setting is on or off. FIG. 7 shows a case where the remote reception setting is on.

FIG. 7 is a flowchart of a remote reception mode executed in the step S8 in FIG. 3.

Referring to FIG. 7, first, in a step S500, the CPU 101 determines whether or not a call has been received. The step S500 is the same as the step S100 in FIG. 4. If it is determined that a call has not been received, the CPU 101 waits for a call, whereas if a call has been received, the CPU 101 proceeds to a step S501.

In the step S501, the CPU 101 determines whether the received call is for voice communication or data communication. The determination in the step S501 is performed according to a media attribute included in the SIP INVITE signal, similarly to the step S101 in FIG. 4. If it is determined in the step S501 that the received call is for data communication, the CPU 101 proceeds to a step S520 to connect the call (sends a SIP "200 OK" signal to the IP network). The step S520 and steps S521 and S522 are the same as the steps S110 to S112 in FIG. 4.

On the other hand, if it is determined in the step S501 that the received call is for voice communication, the CPU 101 proceeds to a step S502, wherein the CPU 101 causes the handset/child phone 115 to ring so as to notify the user of reception of the call using the telephone ringing function of the SLIC 206. Next, in a step S503, the CPU 101 determines whether or not the handset/child phone 115 has been hooked up using the function of the SLIC 206. If it is determined that the handset/child phone 115 has not been hooked up, the CPU 101 returns to the step S502, and continues causing the handset/child phone 115 to ring. On the other hand, if it is determined that the handset/child phone 115 has been hooked up, the CPU 101 proceeds to a step S504.

In the step S504, DTMF detection by the SLIC 206 is started since it is necessary to detect a DTMF signal from the child phone for the remote reception. Then, in a step S505, the CPU 101 stops causing the handset/child phone 115 to ring by the SLIC 206, and connects the signal lines from the IP network to the audio signal processor 114, to the SLIC 206, using the selector 113 so as to enable voice communication using the handset/child phone 115 in a step S506. More specifically, the CPU 101 closes only the switches SW_C and SW_D (ON).

Next, in a step S507, the CPU 101 sends the SIP "200 OK" signal to the IP network and connects the call, whereby voice communication is started in a step S508.

In a step S509, the CPU 101 determines whether or not a predetermined DTMF signal (dial signal) from the child phone has been detected, and if the predetermined DTMF signal has not been detected, the CPU 101 determines whether or not the communication is terminated in a step S514. If the communication is not terminated, the communication state in the step S508 is continued. On the other hand, if it is determined in the step S514 that the communication is terminated, the CPU 101 disconnects the call in a step S513, and returns.

On the other hand, if it is determined in the step S509 that the predetermined dial signal has been detected, to switch the apparatus to T.30 in-band FAX communication, the CPU 101 connects the signal lines from the IP network to the audio signal processor 114, to the MODEM 204 in a step S510. Further, T.30 in-band FAX communication is started in a step S511.

The CPU 101 determines whether or not the communication is terminated in a step S512, and if it is determined that the communication is not terminated, the CPU 101 returns to the step S511 to continue the T.30 in-band FAX communication. On the other hand, if it is determined in the step S512 that the communication is terminated, the CPU 101 disconnects the call in the step S513, and terminates the present process.

As described above, even when the remote reception function setting is on in the manual reception mode, a signal from the IP network is properly connected to the SLIC or the MODEM using the DTMF signal detection function of the SLIC 206. This makes it possible to realize voice communication, detection of a DTMF signal during voice communication, and T.30 in-band FAX communication after detection of the DTMF signal.

Figure 8:
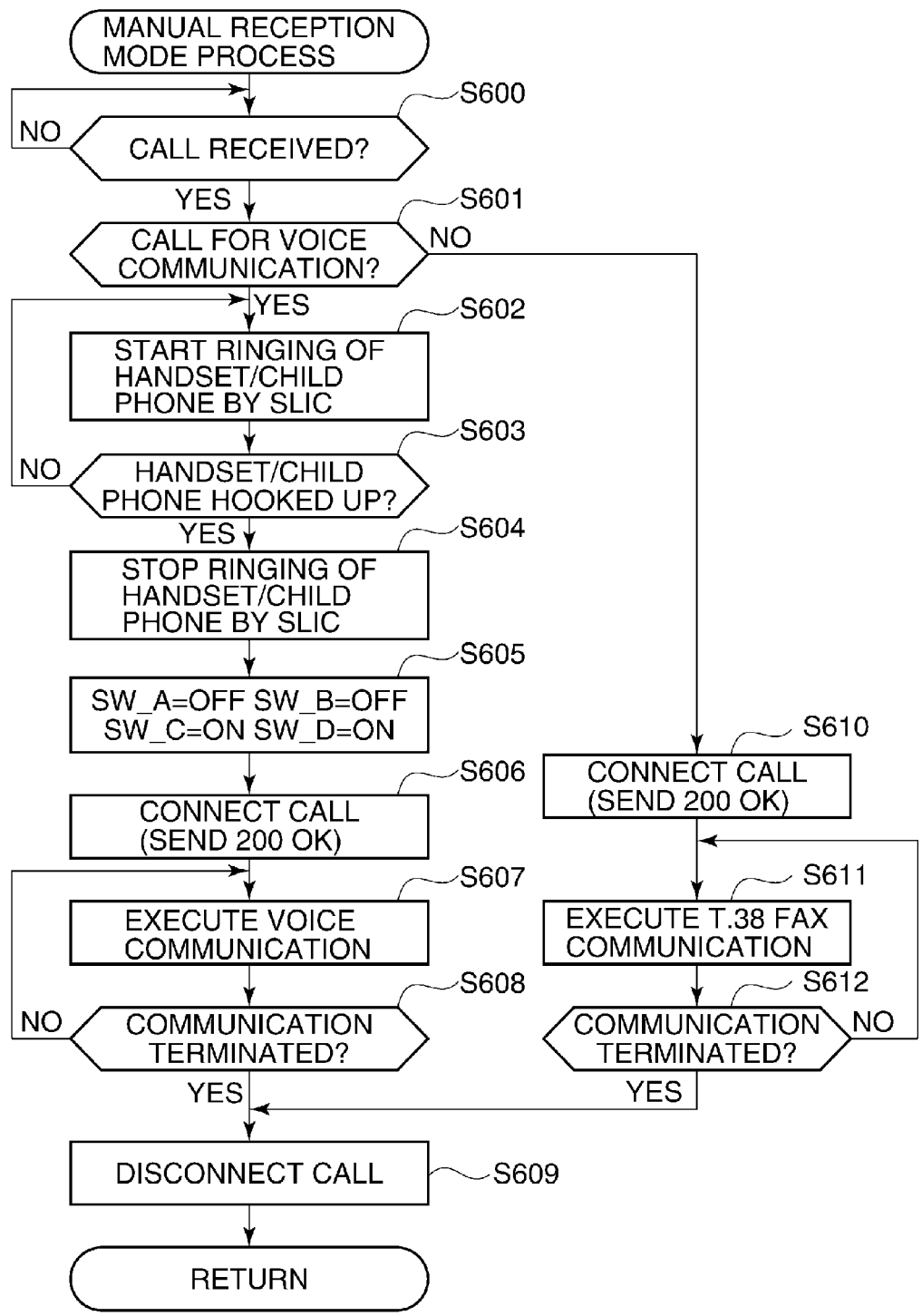
FIG. 8 is a flowchart of a manual reception mode process executed when a manual reception mode is set as a reception mode.

FIG. 8 is a flowchart of the manual reception mode process executed in the step S9 in FIG. 3. FIG. 8 shows a case where the remote reception setting is off in the manual reception mode.

Referring to FIG. 8, first, in a step S600, the CPU 101 determines whether or not a call has been received. The step S600 is the same as the step S100 in FIG. 4. If it is determined that a call has not been received, the CPU 101 waits for a call, whereas if a call has been received, the CPU 101 proceeds to a step S601.

In the step S601, the CPU 101 determines whether the call is for voice communication or data communication. The determination in the step S601 is performed according to a media attribute included in the SIP INVITE signal, similarly to the step S101 in FIG. 4. If it is determined in the step S601 that the call is for data communication, the CPU 101 proceeds to a step S610 to connect the call (sends a SIP "200 OK" signal to the IP network). The step S610 and steps S611 and S612 are the same as the steps S110 to S112 in FIG. 4.

On the other hand, if it is determined in the step S601 that the call is for voice communication, the CPU 101 proceeds to a step S602, wherein the CPU 101 causes the handset/child phone 115 to ring so as to notify the user of reception of the call using the telephone ringing function of the SLIC 206. Next, in a step S603, the CPU 101 determines whether or not the handset/child phone 115 has been hooked up using the function of the SLIC 206. If it is determined that the handset/child phone 115 has not been hooked up, the CPU 101 returns to the step S602, and continues to cause the handset/child phone 115 to ring. On the other hand, if it is determined that the handset/child phone 115 has been hooked up, the CPU 101 proceeds to a step S604.

In the step S604, the CPU 101 stops causing the handset/child phone 115 to ring by the SLIC 206, and connects the signal lines for respective input and output signals from and to the IP network, to the SLIC 206 using the selector 113 in a step S605. Subsequently, in a step S606, a SIP "200 OK" signal is sent to the IP network and the call is connected, whereby voice communication is started in a step S607.

Next, the CPU 101 determines whether or not the voice communication is terminated in a step S608, and if the communication is not terminated, the CPU 101 returns to the step S607 to continue the voice communication. On the other hand, if it is determined in the step S607 that the communication is terminated, the CPU 101 disconnects the call in a step S609, and returns.

As described above, even when the remote reception setting is off in the manual reception mode, it is possible to perform the operation of manual reception by using the handset/child phone-ringing function of the SLIC 206 and further properly connecting the signal lines from the IP network to the SLIC.

FIG. 9 is a diagram showing an example of respective connection states of the switches of the selector 113 in each reception mode of the image communication apparatus 100.

In T.30 in-band FAX communication, the switches SW_A and SW_B are in the closed (ON) state, whereby signals from the network are supplied to the MODEM 204, whereby FAX communication is performed. In the voice communication state in the answerphone connection mode, the switches SW_A, SW_C, and SW_D are in the closed (ON) state, whereby CNG detection by the MODEM 204 and voice communication via the SLIC 206 are enabled. When a CNG signal is detected in this state, the switches are changed to respective states for T.30 in-band FAX communication, and hence it is possible to switch the apparatus to T.30 in-band FAX communication.

In the communication state other than the answerphone connection mode, the switches SW_C and SW_D are in the closed (ON) state, whereby voice communication via the SLIC 206 is enabled.

Further, during operation for detecting a CNG signal in the FAX/TEL-switching mode, the switches SW_A and SW_B are in the closed (ON) state, whereby CNG detection by the MODEM 204 is properly performed. Then, after a CNG signal has been detected, the switches are changed to respective states for T.30 in-band FAX communication, and hence it is possible to switch the apparatus to T.30 in-band FAX communication.

As described above, in the image communication apparatus that is connected to a high-speed digital line network, such as the IP network, and is capable of performing voice communication and T.30 in-band FAX communication defined by the ITU-T Recommendation T.30, the present invention has the following features: In reception modes out of the above-described plurality of reception modes (answerphone connection mode, FAX/TEL-switching mode, and manual reception mode (with remote reception setting "on")), in which it is required to switch the apparatus to T.30 in-band FAX communication after a call is received, signals from the network are properly switchingly supplied to the MODEM or the SLIC. This makes it possible to positively change the apparatus to T.30 in-band FAX communication and support each reception mode.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and function.

REFERENCE SIGNS LIST 100 image communication apparatus
101 CPU
103 display/operation unit
105 printer unit
106 IP packet creation/analysis section
108 ROM
109 RAM
111 T.30/T.38 protocol creation/analysis section
112 network I/F section
113 selector
114 audio signal processor
204 MODEM
205 tone detector
206 SLIC
207 D/A converter
208 A/D converter
209 DTMF detector

The invention claimed is:

1. A communication apparatus that executes communication via an IP network, the communication apparatus comprising:
   a facsimile controller including a tone detector configured to detect a CNG signal, and configured to control facsimile communication;
   a telephone controller configured to control a telephone;
   a selector configured to control whether to supply input signals from the IP network to both the facsimile controller and the telephone controller, or to either the facsimile controller or the telephone controller; and
   a setting unit configured to set a reception mode of the communication apparatus from among a plurality of reception modes including an answerphone connection mode where a facsimile reception starts when the CNG signal is detected,
   wherein the selector provides control, when the answerphone mode has been set by the setting unit:
      according to a call for voice communication being received, so that the input signals from the IP network are supplied to both the facsimile controller and the telephone controller; and
      according to the tone detector detecting the CNG signal, so that the input signals from the IP network are supplied to the facsimile controller and are prevented from being supplied to the telephone controller, and
   wherein after the selector provides control so that the input signals from the IP network are supplied to the facsimile controller and are prevented from being supplied to the telephone controller, the facsimile controller executes in-band facsimile communication via the IP network.

2. The communication apparatus according to claim 1, wherein the selector provides control so that output signals from the telephone controller are supplied to the IP network and output signals from the facsimile controller are prevented from being supplied to the IP network as long as the selector provides control so that the input signals from the IP network are supplied to both the facsimile controller and the telephone controller.

3. The communication apparatus according to claim 1, wherein the facsimile controller executes facsimile communication by deeming an analog signal as voice.

4. The communication apparatus according to claim 1, wherein the facsimile controller includes a modem.

5. The communication apparatus according to claim 1, wherein the telephone controller is an SLIC (subscriber line interface circuit).

6. The communication apparatus according to claim 1, wherein the selector provides control so that output signals from the facsimile controller are provided to the IP network and output signals from the telephone controller are prevented from being supplied to the IP network according to the tone detector detecting the CNG signal.

7. The communication apparatus according to claim 1, wherein:
   the telephone controller causes the telephone to ring according to the call for voice communication being received while the answerphone connection mode has been set, and
   the selector provides control so that the input signals form the IP network are supplied to both the facsimile controller and the telephone controller according to an off-hook state of the telephone being detected.

8. The communication apparatus according to claim 1, wherein:
   the plurality of reception modes include an automatic reception mode where, when a call is received, a facsimile is automatically received without answering the telephone, and
   the selector provides control so that the input signals from the IP network are supplied to the facsimile controller and are prevented from being supplied to the telephone controller according to a call for voice communication being received when the automatic reception mode has been set by the setting unit.

9. The communication apparatus according to claim 1, wherein:
   the plurality of reception modes include a FAX/TEL-switching mode that, when a call is received, automatically determines whether to execute a facsimile reception or execute voice communication using the telephone,
   the selector provides control so that the input signals from the IP network are supplied to the facsimile controller and are prevented from being supplied to the telephone controller according to a call for voice communication being received when the FAX/TEL-switching mode has been set by the setting unit, and
   the facsimile controller executes the in-band facsimile communication via the IP network according to the tone detector detecting the CNG signal.

10. The communication apparatus according to claim 9, wherein:
   the telephone controller causes the telephone to ring according to a call for voice communication being received while the FAX/TEL-switching mode has been set,
   the selector provides control so that the input signals from the IP network are supplied to the telephone controller and are prevented from being supplied to the facsimile controller according to an off-hook state of the telephone being detected, and
   after the selector provides control so that the input signals from the IP network are supplied to the telephone controller and are prevented from being supplied to the facsimile controller, the telephone controller executes voice communication using the telephone via the IP network.

11. The communication apparatus according to claim 1, wherein:
   the plurality of reception modes include a remote reception mode where a facsimile reception is started according to an instruction from a user issued during voice communication using the telephone, and
   the selector provides control so that the input signals from the IP network are supplied to the telephone controller and are prevented from being supplied to the facsimile controller according to a call for voice communication being received when the remote reception mode has been set by the setting unit.

12. The communication apparatus according to claim 11, wherein:
   the telephone controller causes the telephone to ring according to a call for voice communication being received while in the remote reception mode,
   the selector provides control so that the input signals from the IP network are supplied to the telephone controller and are prevented from being supplied to the facsimile controller according to an off-hook state of the telephone being detected, and after the selector provides control so that the input signals from the IP network are supplied to the telephone controller and are prevented from being supplied to the facsimile controller, the telephone controller executes voice communication using the telephone via the IP network.

13. The communication apparatus according to claim 12, wherein:
the telephone controller waits for reception of a DTMF signal from the telephone during voice communication using the telephone via the IP network,
the selector provides control so that the input signals from the IP network are supplied to the facsimile controller and are prevented from being supplied to the telephone controller according to the telephone controller receiving the DTMF signal from the telephone, and
after the selector provides control so that the input signals from the IP network are supplied to the facsimile controller and are prevented from being supplied to the telephone controller, the facsimile controller executes the in-band facsimile communication via the IP network.

14. The communication apparatus according to claim 1, wherein:
the plurality of reception modes include a manual reception mode where only voice communication using the telephone is allowed, and
the selector provides control so that the input signals from the IP network are supplied to the telephone controller and are prevented from being supplied to the facsimile controller according to a call for voice communication being received when the manual reception mode has been set by the setting unit.

15. The communication apparatus according to claim 1, wherein a call for voice communication is an INVITE signal where a media attribute in a SIP protocol is audio.

16. A method of controlling a communication apparatus that executes communication via an IP network, including a facsimile controller, including a tone detector configured to detect a CNG signal, configured to control facsimile communication, a telephone controller configured to control a telephone, a selector configured to control whether to supply input signals from the IP network to both the facsimile controller and the telephone controller or to either the facsimile controller or the telephone controller, and a setting unit configured to set a reception mode of the communication apparatus from among a plurality of reception modes including an answerphone connection mode where a facsimile reception starts when the CNG signal is detected, the method comprising:
a first control step of providing control using the selector, when the answerphone mode has been set by the setting unit, according to a call for voice communication being received, so that the input signals from the IP network are supplied to both the facsimile controller and the telephone controller;
a second control step of providing control using the selector, when the answerphone mode has been set, according to the tone detector detecting the CNG signal, so that the input signals from the IP network are supplied to the facsimile controller and are prevented from being supplied to the telephone controller; and
a facsimile communication step of executing using the facsimile controller, after the second control step, in-band facsimile communication via the IP network.

17. A non-transitory computer-readable storage medium storing a computer-executable control program for causing a computer to execute a method of controlling a communication apparatus that executes communication via an IP network, including a facsimile controller, including a tone detector configured to detect a CNG signal, configured to control facsimile communication, a telephone controller configured to control a telephone, a selector configured to control whether to supply input signals from the IP network to both the facsimile controller and the telephone controller or to either the facsimile controller or the telephone controller, and a setting unit configured to set a reception mode of the communication apparatus from among a plurality of reception modes including an answerphone connection mode where a facsimile reception starts when the CNG signal is detected, the method comprising:
a first control step of providing control using the selector, when the answerphone mode has been set by the setting unit, according to a call for voice communication being received, so that the input signals from the IP network are supplied to both the facsimile controller and the telephone controller;
a second control step of providing control using the selector, when the answerphone mode has been set, according to the tone detector detecting the CNG signal, so that the input signals from the IP network are supplied to the facsimile controller and are prevented from being supplied to the telephone controller; and
a facsimile communication step of executing using the facsimile controller, after the second control step, in-band facsimile communication via the IP network.

* * * * *